(12) United States Patent
Buerchner et al.

(10) Patent No.: US 8,079,165 B1
(45) Date of Patent: *Dec. 20, 2011

(54) PORTABLE SHOPPING AID

(75) Inventors: Michael J. Buerchner, Campbell, CA (US); Christopher N. Pericles, Phoenix, AZ (US); Michael J. Strasser, Lafayette, CA (US); William G. Tannen, Lafayette, CA (US)

(73) Assignees: Michael J. Buerchner, Menlo Park, CA (US); Christopher N. Pericles, Phoenix, AZ (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/684,951

(22) Filed: Jan. 10, 2010

Related U.S. Application Data (63) Continuation of application No. 11/496,744, filed on Jul. 31, 2006, now Pat. No. 7,673,410.

(51) Int. Cl.
*G09F 3/20* (2006.01)
*G09F 3/18* (2006.01)
*G09F 3/10* (2006.01)
*A47G 1/17* (2006.01)
*A47B 97/04* (2006.01)
*A41F 1/00* (2006.01)

(52) U.S. Cl. .......... 40/658; 40/661.03; 40/647; 40/324; 24/336; 24/507; 24/546; 24/10 R; 24/3.12; 24/545; 24/67.11; 24/67.1; 24/543; 24/335; 24/3.1; 248/451; 248/206.5

(58) Field of Classification Search ............... 40/658, 40/661.03, 647, 324; 24/545, 67.11, 67.1, 24/543, 335, 336, 507, 546, 10 R, 3.12, 3.1; 248/451, 206.5
See application file for complete search history.

(56) References Cited

U.S. PATENT DOCUMENTS

| | | | | |
|---|---|---|---|---|
| 344,567 A * | 6/1886 | Coleman | ........................ | 215/391 |
| 4,292,749 A * | 10/1981 | Thomas | ........................ | 40/308 |
| 5,113,554 A * | 5/1992 | Gallo et al. | ........................ | 24/545 |
| 5,845,889 A * | 12/1998 | Suzuki | ........................ | 248/451 |
| 6,477,744 B1 * | 11/2002 | Miles | ........................ | 24/3.12 |

* cited by examiner

*Primary Examiner* — Joanne Silbermann
*Assistant Examiner* — Syed A Islam
(74) *Attorney, Agent, or Firm* — Marc P. Schuyler (57) ABSTRACT

This disclosure provides a portable shopping aid used to mount a shopping list, coupons, or other documents. Contrary to conventional wisdom, the aid is configured to sacrifice a writing surface in favor of portability, by providing a small body that may be easily inserted into a pocket or handbag. The body includes a clamp for mounting the aid onto a push bar of a shopping cart, for hands free viewing during shopping, as well as a document clip mechanism that clips documents by their ends closest to the push bar. In order to provide structural rigidity to retained documents, and notwithstanding the absence of a writing surface or clipboard, the clip mechanism is configured to crease documents. The shopping aid also includes feet for standing the aid upright, on a flat surface, and means for mounting the aid magnetically on a refrigerator wall, in all cases such that retained documents are presented in a convenient reading orientation. The aid is further designed so that it can be made in a single mold, thereby lowering design costs.

23 Claims, 6 Drawing Sheets

PORTABLE SHOPPING AID

The present invention relates to a shopping aid. More particularly, the present invention relates to a portable shopping list or coupon holder adapted for selective attachment to shopping carts.

BACKGROUND

With the advent of supermarkets in the latter half of the twentieth century, shoppers found they could buy an increasing variety of goods in a single store. With this ability came a consistent need for shopping carts to handle the diversity and quantity of goods that shoppers could buy at one location. This evolution however also increased the complexity of the typical shopping trip; shoppers now often needed lists to provide reminders of all the goods they desired, and price comparisons and coupon shopping became a frequent exercise as competing brands battled for consumers' business.

To address the consumers' needs for organization of lists and coupons, shopping aids were developed. Often configured as devices that would physically attach to shopping carts, these aids often focused on providing a clipboard and writing surface to enable a shopper to both attach a shopping list and to facilitate checking items off the list or to add new items to the list while the shopper was pushing a shopping cart.

Many early designs reflected the approach that the shopping aid had to provide a firm, relatively horizontal writing surface, or "desk." Because permitting the shopper to write was an essential aspect, these designs often required bulky clipboards and complicated mounting mechanisms in order to provide needed writing surface stability. These designs also often obstructed the child seat built into many shopping carts and they tended to not be very portable.

Other designs reflected an approach of reconciling the need for a firm writing surface with the perception that portability was essential to acceptance by the shopper; these designs also typically emphasized a flat, horizontal writing surface, but they often either compromised writing surface support structures to make the aid more portable or they created complicated folding mechanisms, to "break down" the size of the writing surface. While useful for their intended purposes, these shopping aids still tended to not be very portable and the bulk of a writing surface still made it impractical to fit the shopping aids into a purse or pocket. The complicated mechanisms used to make the devices foldable or compactable often also dramatically increased the cost of these devices.

There continues to be a need for a shopping aid that is both practical and low cost. Ideally, such a shopping aid would be compact, such that it could fit into a purse, or perhaps even a pocket, making it easy for a shopper to take the aid from home to a store. Ideally still, such a device could be selectively attached to and detached from a conventional shopping cart, yet would not have the conventional compromises needed to support a bulky writing surface, e.g., a complex support structure to stably support the writing surface with respect to the shopping cart. The present invention satisfies these needs and provides further, related advantages.

SUMMARY

The present invention satisfies these needs by providing a shopping aid that may be easily and conveniently carried with a shopper. More particularly, the present invention provides a low cost shopping aid that may be used to selectively clip a shopping list or coupons and that may be easily attached and detached from a shopping cart, so as to provide hands-free display to the shopper while in a store. Designs provided by the present invention reflect the approach that a stable, hard, horizontally supported writing surface is not an absolute shopping requirement and they provide mechanisms that are relatively more portable, more practical, and more likely to be used by the conventional shopper. As should be apparent, therefore, the present invention extends the usability of shopping aids.

One form of the present invention provides a low cost shopping aid adapted for attachment to a shopping cart. The shopping aid includes a mechanism designed to clip at least one document and hold that document in an orientation suitable for reading by the shopper. The shopping aid also includes a mounting mechanism that is used to attach the shopping aid to the shopping cart. The aid may be formed in a single mold, thereby facilitating low cost manufacture.

A second form of the present invention provides a shopping aid with two substantially opposite ends, one having clipping jaws sized to engage the horizontal "push bar" of a shopping cart and a document clip at the other end. The clip mechanism is sized relatively small compared to the dimensions of a conventional notepad (e.g., on the order of the size of a standard index card, or perhaps slightly larger) and provides no inherent writing surface for the notepad. Using this philosophy, contrary to conventional wisdom that a stable, horizontal writing surface is a necessary element, embodiments of the invention can be made quite small, e.g., so as to fit easily inside a purse or handbag, or perhaps even a shirt or pants pocket.

Other forms of the invention provide a shopping aid that can be readily mounted to a refrigerator or other appliance, and that can also stand upright on its own on a flat surface, always displaying retained documents in a consistent, generally vertical orientation (e.g., roughly parallel to the wall of a refrigerator). Still other forms provide for a document clip configured to clip at least one document in a direction opposite the push bar of the shopping cart; the document clip may be made to crease the document to assume a slight "v-profile" so as to make the document somewhat rigid notwithstanding the force of gravity, and the aid provided by this form of the invention may assume several orientations with respect to the shopping cart.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 2 is another perspective drawing similar to FIG. 1, but that shows a shopping aid alone, without a shopping list or shopping cart; FIG. 2 also shows several reference axes.

FIG. 10 is a right side view of the shopping aid of FIG. 2, but shows the shopping aid holding at least one document.

DETAILED DESCRIPTION

The invention summarized above and defined by the enumerated claims may be better understood by referring to the following detailed description, which should be read in conjunction with the accompanying drawings. This detailed description of one or more particular embodiments, set out below to enable one to build and use various implementations of the invention, is not intended to limit the enumerated claims, but to exemplify their application to certain devices. The description set out below exemplifies application of the invention to a specific, low-cost shopping aid that may be easily inserted in a handbag or pocket. The invention, however, may also be applied to other devices as well.

Figure 1:
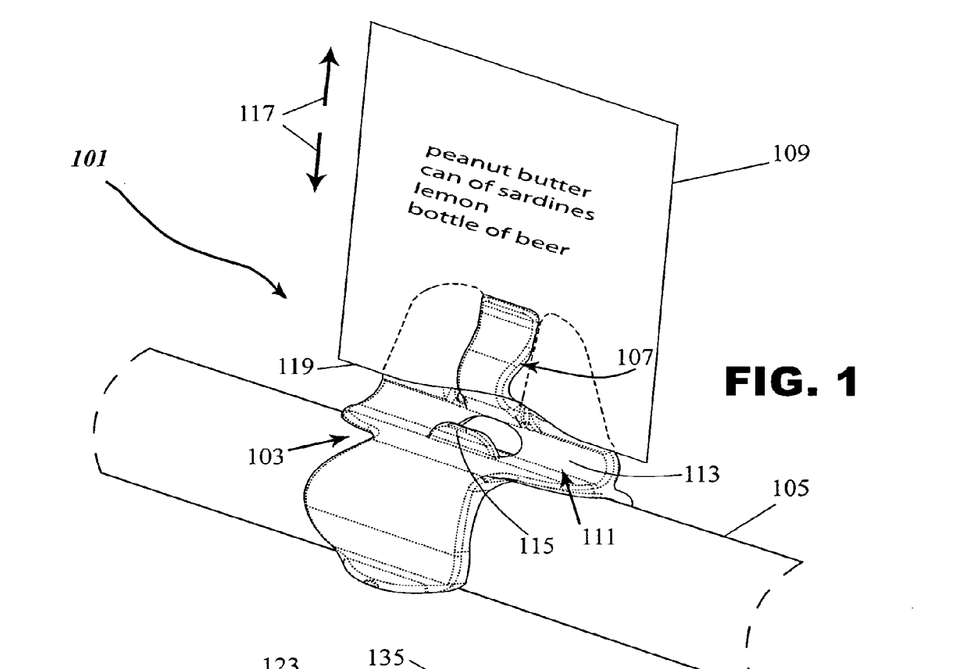
FIG. 1 is a perspective diagram showing a specific shopping aid that embodies principles of the present invention; the shopping aid is illustrated as holding a shopping list and as selectively attached to the push handle of a shopping cart.
Figure 2:
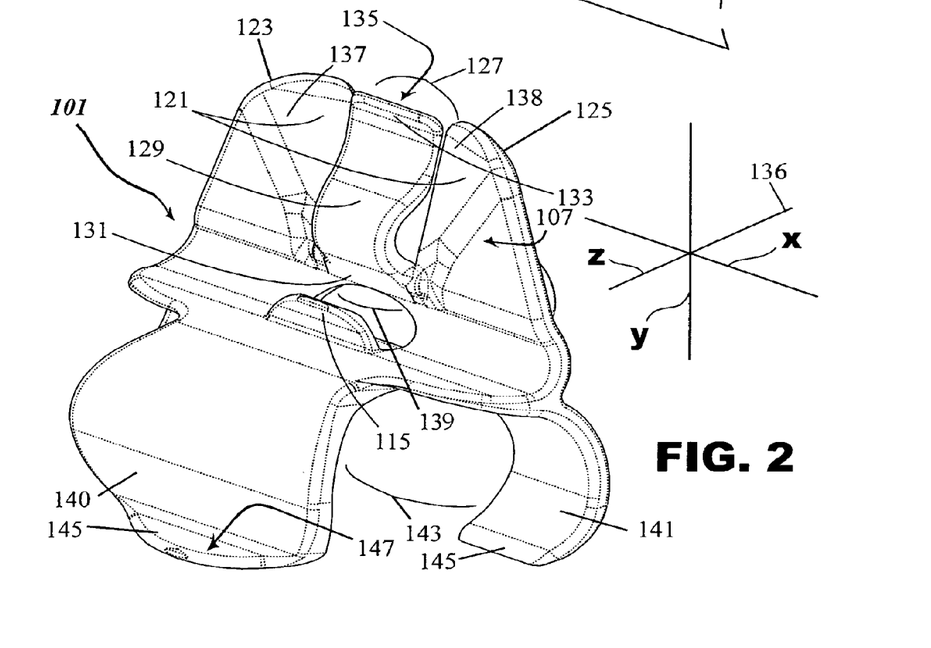
Figure 3:
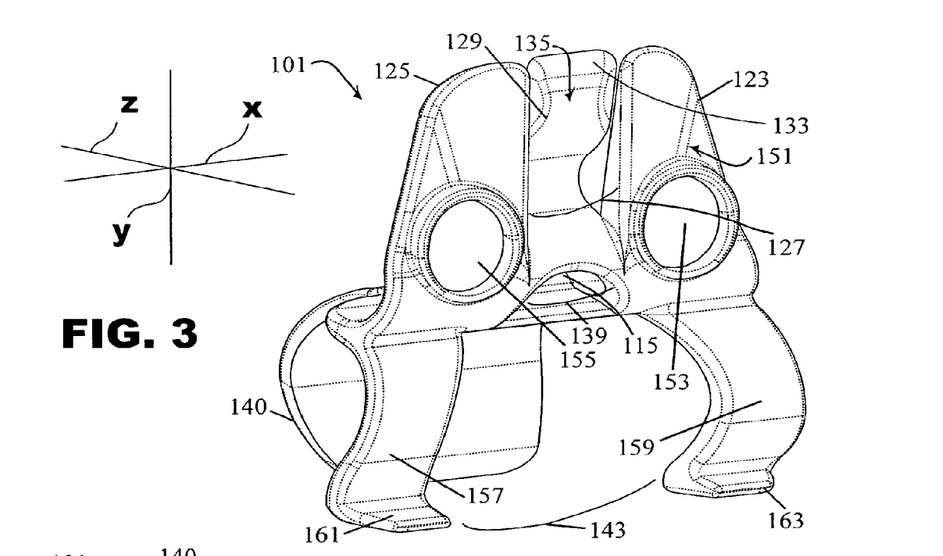
FIG. 3 is another drawing of the shopping aid of FIG. 2, showing the shopping aid from a different perspective.

FIGS. 1-3 provide three perspective views used to introduce certain advantages of a specific shopping aid design that will be discussed below. Additional detail concerning the configuration, use, and manufacture of this shopping aid design will be presented further below, in connection with FIGS. 4-12.

I. Introduction to the Particular Shopping Aid Seen in the Drawings

FIG. 1 provides a perspective view of one particular shopping aid 101 that illustrates principles of the present invention. The shopping aid is primarily formed of a unitary piece of plastic, such that it does not have multiple parts that move with respect to one another, and so that it is highly portable, adapted to readily attach to a shopping cart and to simply "clip" documents that a shopper might want to take to the supermarket, such as a list or coupons. The shopping aid is of a size on the order of three inches by three inches by two inches deep, such that it may be conveniently carried in a shopper's purse or pocket, making it lightweight and convenient. As will be noticed from FIG. 1, contrary to conventional wisdom, the shopping aid includes no inherent writing surface. As will be explained further below, the shopping aid seen in FIG. 1 has a lower half that forms a clamp 103 that a shopper can snap onto and off of the "push bar" or the horizontal, primary "handle" 105 of a shopping cart, and an upper half that forms a document clip mechanism 107, used to clip the base 119 of at least one document 109. This configuration allows the shopper "hands-free" access to the document (e.g., shopping list) during shopping, and it also provides for easy detachment of the shopping aid once shopping is completed. Each of the push bar 105 and the document(s) 109 can be engaged by a snapping or clipping action, i.e., with the spring force of the plastic providing the force used to retain the shopping aid on the cart in a stable position, and the document in a reading orientation, respectively. The clipboard also has a pencil or pen holder 111 to carry a writing device for a shopper's convenience, formed via a recess 113 in the base of the document clip mechanism, and via a pencil clip 115 that clips a pen or pencil snugly into the recess.

The shopping aid of FIG. 1 also departs from conventional wisdom in two other senses, in that it clips the base 119 of the document 109, i.e., that end of the document that is closest to the push bar 105 (and so does not act as a "clipboard", e.g., by clipping a document from above, and in that it clips the push bar 105 and the document 109 essentially in opposite directions, as indicated by arrows 117). Conventionally, a clipboard design would be required to support the document in a reading orientation, e.g., so that it does not bend upon itself under the force of gravity; however, for the shopping aid seen in the attached figures, this problem is minimized through a novel feature of the document clip mechanism 107; the document clip mechanism 107 "creases" the base 119 of the document, so as to provide not only adequate friction to hold the document in place, but also to impart structural rigidity to documents without a hard backing or inherent writing surface, even to an appropriately sized sheet of paper alone, to remain in a consistent orientation notwithstanding the force of gravity. As should be apparent from this description, the shopping aid 101 presented in the figures provides a small, inexpensively manufactured device, to the point that it is both very portable and inexpensive (so much so that it may be employed in business models where the aid is given to consumers, with companies printing their advertisements on the aid and giving it away for free for advertising purposes).

FIG. 2 provides a perspective view of the shopping aid 101, but shows the aid without any accompanying documents or a shopping cart handle. As seen in FIG. 2, the document clip mechanism 107 includes a support member 121, which serves as a backing for documents that will be retained by the clip mechanism. In the specific aid seen in FIG. 2, this member 121 is configured as two spaced-apart vertical supports 123 and 125, with a gap 127 defined there between. A document clip or clipping member 129 opposes these supports and the gap, and is close proximity to these supports for purposes of holding onto a document (e.g., a list of coupons) through spring force provided by the clipping member. The clipping member 129 is a static part that is resiliently deformed when one or more documents inserted into the aid, with the clipping member acting as a leaf spring; for example, as documents are inserted into the clip mechanism 107 (in the manner seen in FIG. 1), the clipping member 129 is bent slightly away from the backing provided by the document support 121, and so applies spring force against the document, to force it against the document support 121 and retain the document in place. The clipping member 129 is coupled to the aid at a lower end 131, and has an s-profile that terminates in an upper end 133, and a surface 135 adapted to engage documents to be retained by the aid. [This surface is on the rear side of the clipping member 129 in the perspective presented by FIG. 2.] The clipping member 129 is positioned to contact the document in the exact position defined by the gap 127, in a manner that serves two primary purposes.

First, as has been mentioned above, the shopping aid of FIGS. 1-2 departs from conventional wisdom by sacrificing a substantial writing surface or clipboard in favor of portability; the clipboard provided by many conventional designs serves a purpose, not only of providing a writing surface, but of keeping the document in a vertical, "normal" reading orientation (where gravity would be expected to cause the document to fall over in absence of the clipboard). As mentioned above, the present shopping aid creases the document in order to provide some measure of vertical rigidity in absence of any substantial clipboard or writing surface. As seen in FIG. 2, the clipping member 129 urges documents rearward at the location of the gap, along the "z" dimension, indicated by references axes 136 (into the page); the support member 121 urges the document forward, in the opposite direction on either side of this gap to thereby crease the document to impart this rigidity. The two vertical supports 123 and 125 each have an ear 137 and 138, respectively, that folds inward, toward the gap, for purposes of enhancing this crease. Additional detail will be presented below regarding the document clip mechanism and these ears 137 and 138.

Second, however, the shopping aid of FIGS. 1 and 2 is ideally manufactured in a single mold and, to further this end, it has no "moving" parts; it is made to have no overlapping parts in the direction in which mold halves will be separated—in the design presented by FIG. 2, mold halves meet in the "x/y" plane, and are separated along the "z" dimension, and so, the aid is deliberately designed to have no overlapping members in this dimension, e.g., the clipping member 129 is also made to not overlap the vertical supports but rather to align with the gap 127. In similar fashion, the pen or pencil holder is configured so that the pencil clip 115 aligns with a gap 139 formed within the recess 113 along this same "z" dimension, and the clamp is configured as a "c-clamp" to have forward and rearward jaws 140 and 141, with the forward jaw matching a gap 143 defined between two members of the rearward jaw (only one of these rear jaws is visible in FIG. 2).

Another advantage of the design of the shopping aid 101 seen in FIGS. 1-2 is that it is generally intended to display a shopping list or other document in a consistent, generally vertical, reading orientation, e.g., in the "x/y" plane identified in FIG. 2. [This orientation does not need to be precisely vertical, e.g., it could be made to be on a slight incline, but the design advantage presented is that the aid 101 is adapted to display documents in an easy-to-read manner in a number of different configurations.] First, as mentioned, the aid 101 can be clipped to the push bar of a shopping cart as seen in FIG. 1. Second, the aid can (as will be described further below) be magnetically mounted to an appliance, such as a refrigerator wall, and it also in this position displays documents again in an easy-to-read manner (e.g., substantially parallel to the appliance surface, which may also serve as a writing surface for the documents). Third, the shopping aid of FIGS. 1-2 is also made to stand erect on a horizontal surface (e.g., a surface parallel to the "x/z" plane as seen in FIG. 2; to this end, the jaws 140 and 141 of the c-clamp can be made to terminate in ends 145 to support the aid on such a surface. In the particular design presented in the accompanying figures, these ends can terminate in horizontal flanges that can act as support feet; FIG. 2 illustrates one such foot 147, formed at the end of the forward jaw 140.

FIG. 3 presents yet another perspective view of the shopping aid, and presents additional clarity as to the non-overlapping nature of the design along the "z" dimension. In particular, FIG. 3 more clearly illustrates the nature of the document clip mechanism, including a s-profile clip, or clipping member, 129 and an engagement surface 135 of that clipping member that engages documents and urges them rearward. The engagement overlaps the gap 127 formed between the two vertical support members 123 and 125. The rear surface 151 of the aid as mentioned can have a magnetic mounting means for magnetically mounting the aid 101 to an appliance, as mentioned, and to this end can support one or more magnets; the design of FIG. 3 in particular uses two magnets, 153 and 155, each mounted on one of the vertical support members 123 and 125. FIG. 3 also helps illustrate the non-overlapping nature (along the "z" dimension) of the pen or pencil holder, including the relationship between the pencil clip 115 and its matched gap 139, to permit separation of two mold halves along the "z" dimension for ease of manufacture. Finally, FIG. 3 also shows two members 157 and 159 of the rearward jaw the c-clamp and how each of these members terminates in support feet 161 and 163. As mentioned, these members also define the gap 143 to be matched to the forward jaw 140 of the c-clamp, to permit separation of mold halves along the "z" dimension.

With the principal parts of a shopping aid design thus introduced, additional details regarding the configuration, use, and manufacture of this shopping aid design will be presented further below, and in connection with FIGS. 4-12.

II. Configuration of the Document Clip Mechanism

Figure 4:
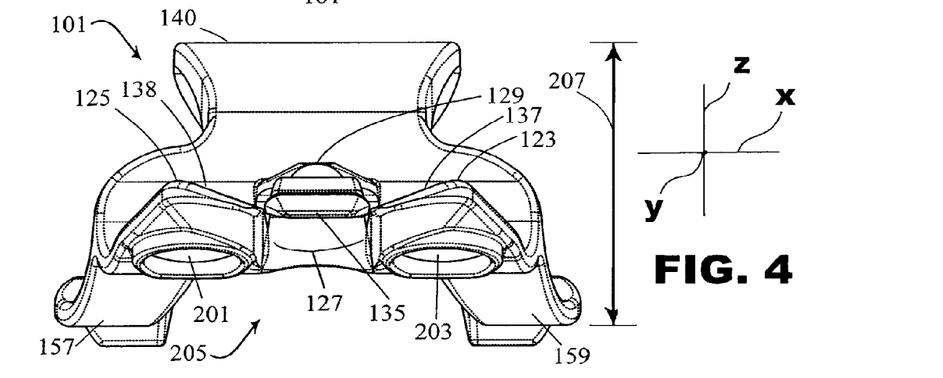
FIG. 4 is a plan view of the top of the shopping aid of FIG. 2.
Figure 5:
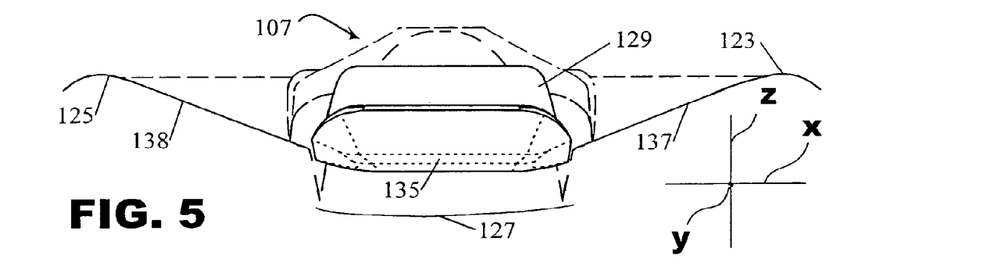
FIG. 5 is an exploded plan view of a document clip mechanism of the shopping aid of FIG. 4.
Figure 6:
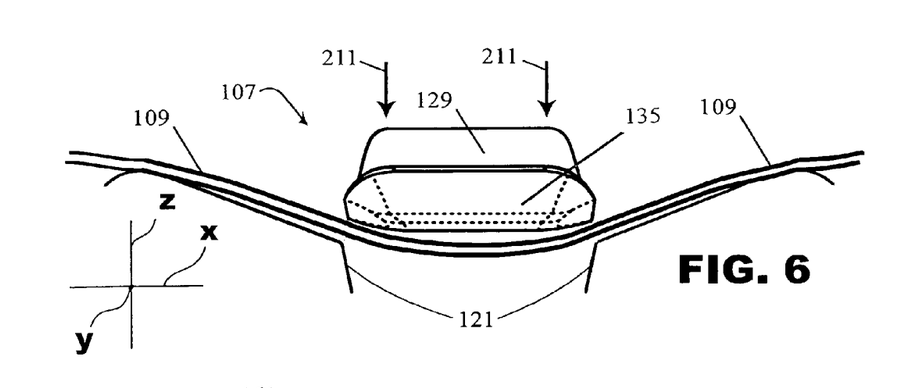
FIG. 6 is a view of the top of the document clip mechanism from FIG. 5, but shows that mechanism holding a document under spring force, indicated by two reference arrows.

FIGS. 4-6 are used to further explain the configuration and operation of the document clip mechanism of the shopping aid of FIGS. 1-3.

FIG. 4 presents a top, plan view of the shopping aid 101, and shows forward and rearward jaws of the c-clamp, 140 and 157/159, respectively, as well as spaced apart vertical supports 123 and 125 and a clipping member 129 of the document clip mechanism. FIG. 4 also illustrates receptacles 201 and 203 that are used to house magnets (not seen in FIG. 4) on the rear 205 of the shopping aid. As seen in FIG. 4, each vertical support 123/125, respectively, presents a substantially flat back surface, but presents canted "ears" 137/138, slanted away from the gap 127, to help "crease" documents on either side of the clipping member 129; the contact surface 135 of the clipping member urges the document in a rearward direction (i.e., parallel to the "z" axis depicted in FIG. 4), while the vertical supports urge the document in the opposite direction. FIG. 4 helps illustrate the overall dimensions of the device, with dimension arrows 207 representing the approximate width of a standard shopping cart push bar, on the order of 1¼ inches diameter.

FIG. 5 presents additional detail regarding the document clip mechanism 107, presenting top view of that mechanism. In particular, FIG. 5 shows the relationship between the vertical supports 123 and 125, the gap 127 formed between these vertical supports, and the correspondence of this gap 127 and the width and configuration of the clipping member 129. [Solid lines in FIG. 5 represent the "top" of the clip mechanism, e.g., in the vicinity where the contact surface 135 would engage retained documents; large-dash lines represent the base of the clip mechanism, e.g., identifying the base of the vertical supports 123 and 125, and the "s"-profile configuration of the clipping member 129 along the "z"-axis; and small dash lines illustrate the curvature of the contact surface 135, as being generally flat with a sloped periphery to, in combination with "ears" 137 and 138, help crease retained documents.]

FIG. 6 presents a view of the clip mechanism similar to FIG. 5, but which shows a document 109 inserted into the clip mechanism. [FIG. 6 omits the large dash lines which were used in FIG. 5 to illustrate the base of the clip mechanism.] In particular, as a document is inserted, the clipping member 129 is push away from the support member 121; as the clipping member has an "s"-profile, and is formed of plastic integral to the body of the aid, this deformation causes the clipping member to act as a leaf spring, and apply force in the direction indicated by arrows 211. The contact surface 135 urges the document 109 rearward, while the "ears" provided by the support member 121 urge the document forward, in the opposite direction, on either side of the contact surface 135. The creasing provided by this action, while occurring substantially at the location at which retained documents are clipped, should provide enough vertical stability to urge note-size documents or small sheets of paper to have adequate rigidity to assume a consistent reading orientation, notwithstanding the absence of any substantial writing surface. [As used in this description, a conventional "note-size" document, or the size of a conventional notepad, will be used to refer to sizes on the order of a conventional index card, e.g., 3 by 5 inches or 4 by 6 inches. With a shopping aid of a size approximately 3 inches square in the plane occupied by the document, the support member 121 provides backing for the document only in an area of approximately 1 inch high by 2 inches wide.]

III. Configuration of the Shopping Cart Clamp Mechanism

Figure 7:
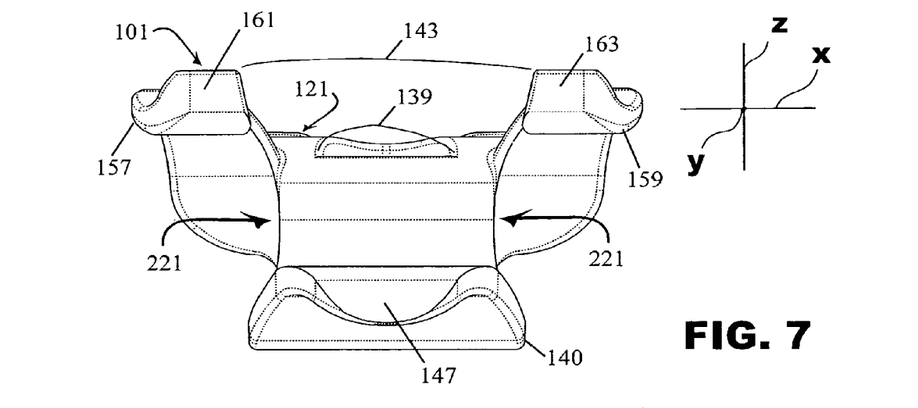
FIG. 7 is a plan view of the bottom of the shopping aid of FIG. 2.
Figure 8:
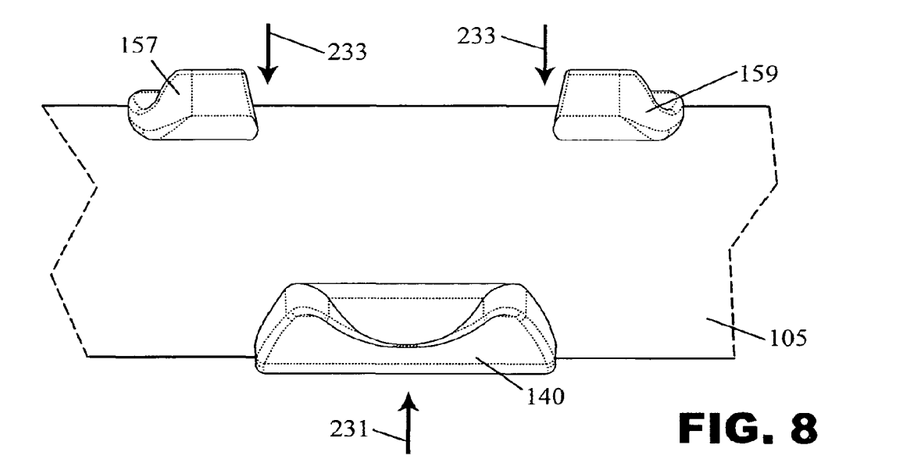
FIG. 8 is an illustrative view showing the c-clamp from FIG. 7 engaging the "push bar" or push handle of a shopping cart.
Figure 9:
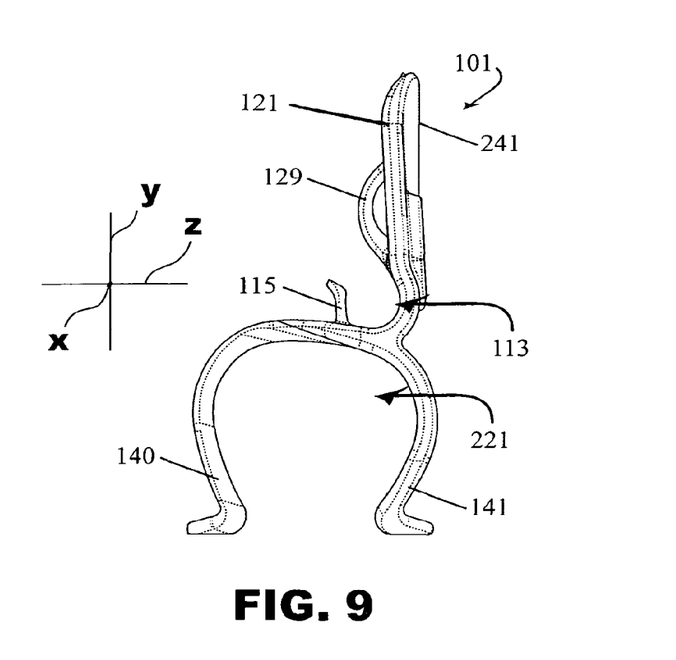
FIG. 9 is a left side view of the shopping aid of FIG. 2.

FIGS. 7-9 are used to explain the configuration and operation of the document clip mechanism of the shopping aid of FIGS. 1-3.

FIG. 7 presents a bottom view of the shopping aid 101 of FIG. 2. In particular, FIG. 7 more clearly shows the feet 147, 161 and 163 upon which the shopping aid may be made to stand on a horizontal surface (not shown in FIG. 2). These feet are mounted at the terminal ends of forward and rearward "c-clamp" jaws (140 and 157/159 respectively), which define a cavity 221 which is adapted to receive the push bar of a shopping cart (also not shown in FIG. 7). The jaws define the cavity to be arcuate in shape, to roughly match the size and curvature of a conventional shopping cart push bar (e.g., a circular bar roughly on the order of 1¼ inches in diameter). By "c-clamp," it is meant that the shopping aid of FIGS. 2 and 7 is designed in the form of a particular clamp, is formed as a single integral piece, with curved jaws that define a rough "c" profile in the "y/z" plane of FIG. 7. When it is desired to clamp the shopping aid onto a shopping cart, a shopper merely pushes the clamp onto the push bar to deform forward and rearward jaws (140 and 157/159) away from one another (in the dimension of the "z" axis of FIG. 7), and the "c" profile allows the ends of the jaws, adjacent the feet, to snap back and resiliently engage the push bar of the shopping cart, using force sufficient to prevent free rotation of the shopping aid around the push bar, but force that is weak enough to permit a conventional shopper to also easily remove the shopping aid. FIG. 7 also illustrates the gaps 139 and 143 in the support member 121 and rear jaw 157/159 that match the pencil clip (not shown in FIG. 7) and the forward jaw 140, respectively, so as to permit manufacture of the shopping aid using a single mold process.

FIG. 8 shows a view of the c-clamp of the shopping aid of FIG. 7, showing that clamp engaging the push bar 105 of a shopping cart. As seen in FIG. 8, the forward jaw 140 curves around the push bar and engages the push bar under spring force, indicated by arrow 231. Similarly, the two members 157 and 159 of the rearward jaw also curve around the push bar 105 and engage the push bar under spring force, as indicated by two arrows 233, in an opposing direction.

FIG. 9 shows a side-view of the left side of the shopping aid 101 of FIG. 2. In particular, FIG. 9 helps illustrate the "c"-profile formed by forward and rearward jaws 140 and 141 of the c-clamp, as well as part of the "s"-profile of the clipping member 129. As indicated earlier, the jaws 140 and 141 define a cavity 221 that is sized and adapted to engage a substantially circular shape of a shopping cart push bar (not seen in FIG. 9). In addition, FIG. 9 also helps show how the "s"-profile of the clipping member 129 helps ensure that only the contact surface of the clipping member contacts and pressures documents to clip them to the aid. [The contact surface is not clearly visible in FIG. 9 as it is partially obscured in FIG. 9 by support member 121, but it provides for documentary contact by the clipping member at a location generally indicated by reference numeral 241.] FIG. 9 also shows the cross-sectional configuration of the recess 113, and how it is shaped to retain a pen or pencil at a base of the support member 121; when a pen or pencil is inserted in this recess (with its length parallel to the "x" dimension indicated by FIG. 9), the pen or pencil clip 115 is deformed away from the support member 121, in much the same manner as the document clipping member 129, to act as a leaf spring that retains the pen or pencil in the recess 113, permitting it to be snapped into or out of place. As indicated earlier, all walls and flanges of the shopping aid 101 are made to be non-overlapping in a dimension that permits fabrication of the aid in a single mold; using the example presented by FIG. 9, the pen or pencil clip 115 is made so as to not overlap the support member 121 (i.e., it is matched to a gap in the support member, the gap not being seen in FIG. 9); the document clipping member 129 is similarly made to overlap the support member, by its match to a gap in the support member in the "z"-dimension; and, the forward jaw 140 and rearward jaw 141 are configured to similarly not overlap in the "z"-dimension.

IV. Attachment of the Aid to Horizontal and Vertical Surfaces

Figure 10:
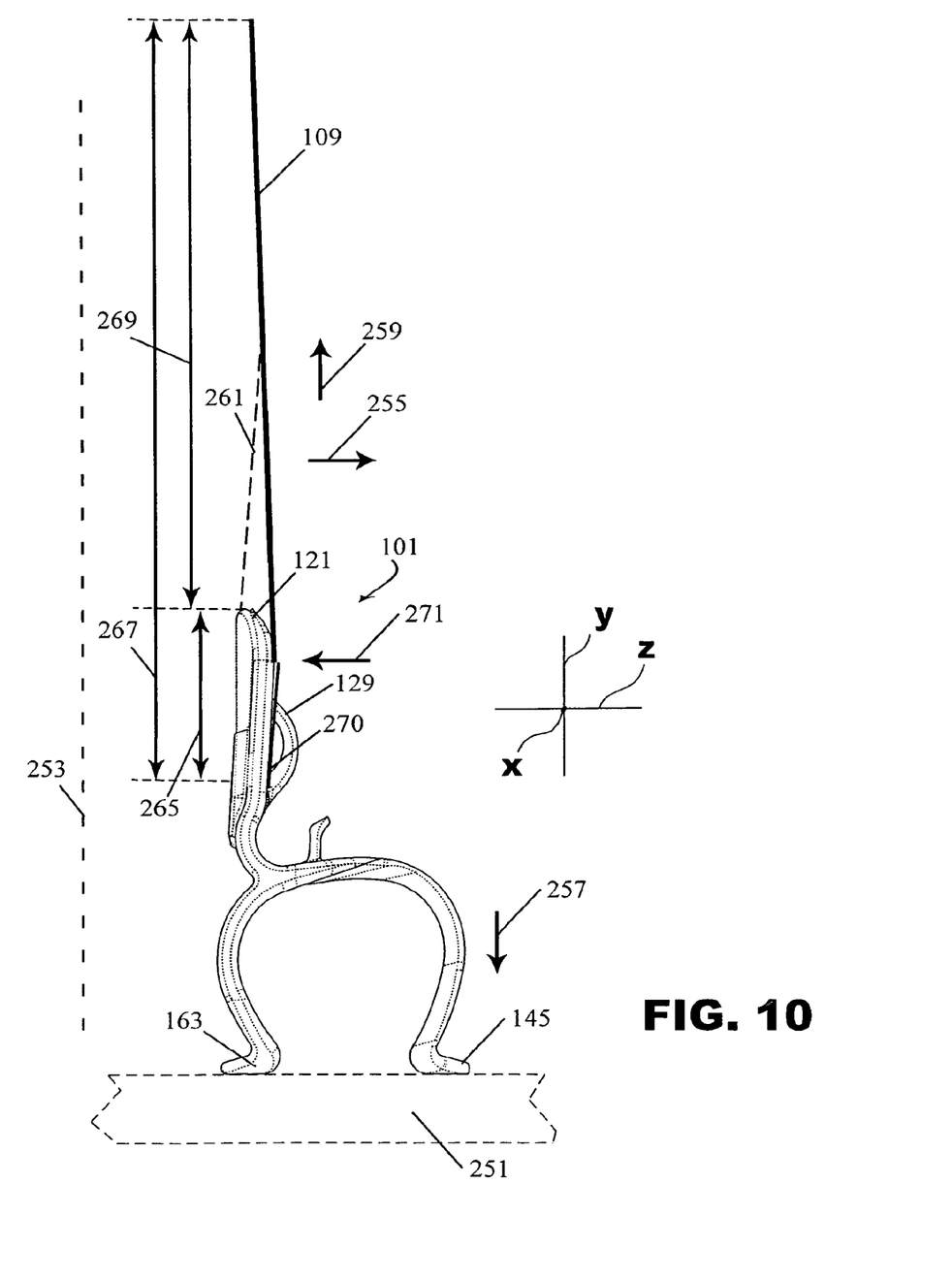
FIG. 10 also shows the shopping aid with respect to horizontal and vertical surfaces (e.g., when the shopping aid is standing on its feet on a horizontal surface, or magnetically engaged to the vertical wall of an appliance, such as a refrigerator), and shows the shopping aid's orientation (and the document(s)' orientation) with respect to each of these surfaces.
Figure 12:
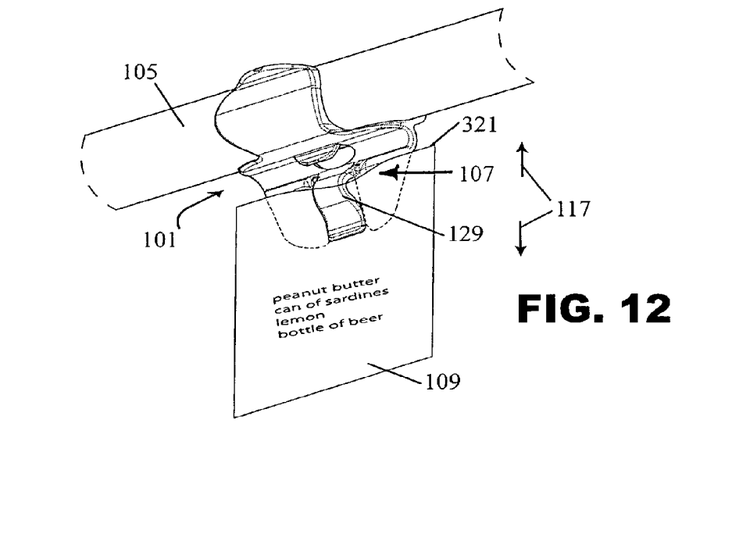
FIG. 12 is a perspective view of the aid of FIG. 2, but which shows the aid in an inverted orientation, e.g., where it clips at least one document in a reading orientation below the push bar of a shopping cart.

FIG. 10 is used to explain the configuration and operation of the document clip mechanism of the shopping aid of FIGS. 1-3. In particular, FIG. 10 presents a right side view of the aid 101 where the aid is seen holding a document 109 and optionally either set upon a horizontal surface 251 or magnetically mounted to a vertical surface 253. As indicated by FIG. 10, in either case, the document 109 is supported in a substantially consistent orientation that defines a reading direction and orientation, indicated by reference arrow 255 in FIG. 10. Although the shopping aid may alternatively be clipped to a shopping cart (not seen in FIG. 10), and may be rotated by a shopper somewhat around the shopping cart's push bar (or even inverted, as depicted by FIG. 12), the design of the shopping aid 101 is such that it preferentially always displays retained documents in a consistent orientation. An additional advantage of this configuration is that when the aid is magnetically mounted to a vertical surface, such as surface 253, that surface may also be used as a writing surface if it is desired to write upon the document 109.

FIG. 10 also helps show how creasing of the document 109 helps impart some measure of vertical rigidity. FIG. 10 depicts a crease line 261 at the center of the document, to help depict how the document is deformed in the "z"-dimension. While documents may bend somewhat under the influence of gravity, depending on their overall height and their weight, the creasing action performed by the document clipping member 129 preferably is sufficient to render retained documents generally readable in any of the mountings depicted by FIG. 10 (or to a shopping cart push bar as seen in FIGS. 1 and 8).

FIG. 10 also helps show the configuration of the aid 101 to sacrifice any substantial inherent writing surface or "clipboard" to improve portability and usability of the device. In particular, dimension arrows 265, 267 and 269 respectively indicate dimensions of (a) backing or support provided by the document support member 121, (b) the height of a typical "index card sized" note pad relative to the shopping aid, and (c) the relative portion of such a typical note pad that is left unsupported by any inherent writing support of the aid of FIGS. 1-3. As indicated earlier, with a shopping aid of general dimensions of three inches by three inches by two inches (in the "x", "y" and "z" dimensions respectively) and a conventional note pad size of 3 inches by 5 inches or 4 inches by 6 inches, with dimension arrow 267 indicating the longer of the notepad dimensions in typical mounting upon the aid, the support member 121 will provide backing for the document along a height 265 that is on the order of one inch, or approximately less than twenty percent of the height of a conventional "index card" sized note pad; otherwise stated, a substantial portion 269 of conventional notepads are left deliberately unsupported by any inherent writing support or backing provided by the shopping aid 101. As this structure also implies, the clamp portion of the aid accounts for most of the structure of the aid in the vertical dimension, e.g., the aid being approximately three inches high, with on the order of two inches devoted to clamping a shopping cart push bar of about two inches diameter, and slightly more than one third of the aid devoted to the clip mechanism; the clamp accounts for no less than forty to sixty percent of the structure of the aid in the vertical dimension. [The shopping aid of FIG. 10 permits the document 109 to be pushed as far down within the document clip mechanism as a cradle 270, with the document clipping member 129 providing force to retain the document 109 at substantially the position indicated by reference arrow 271.]

V. Fabrication of the Aid in a Single Mold

Figure 11:
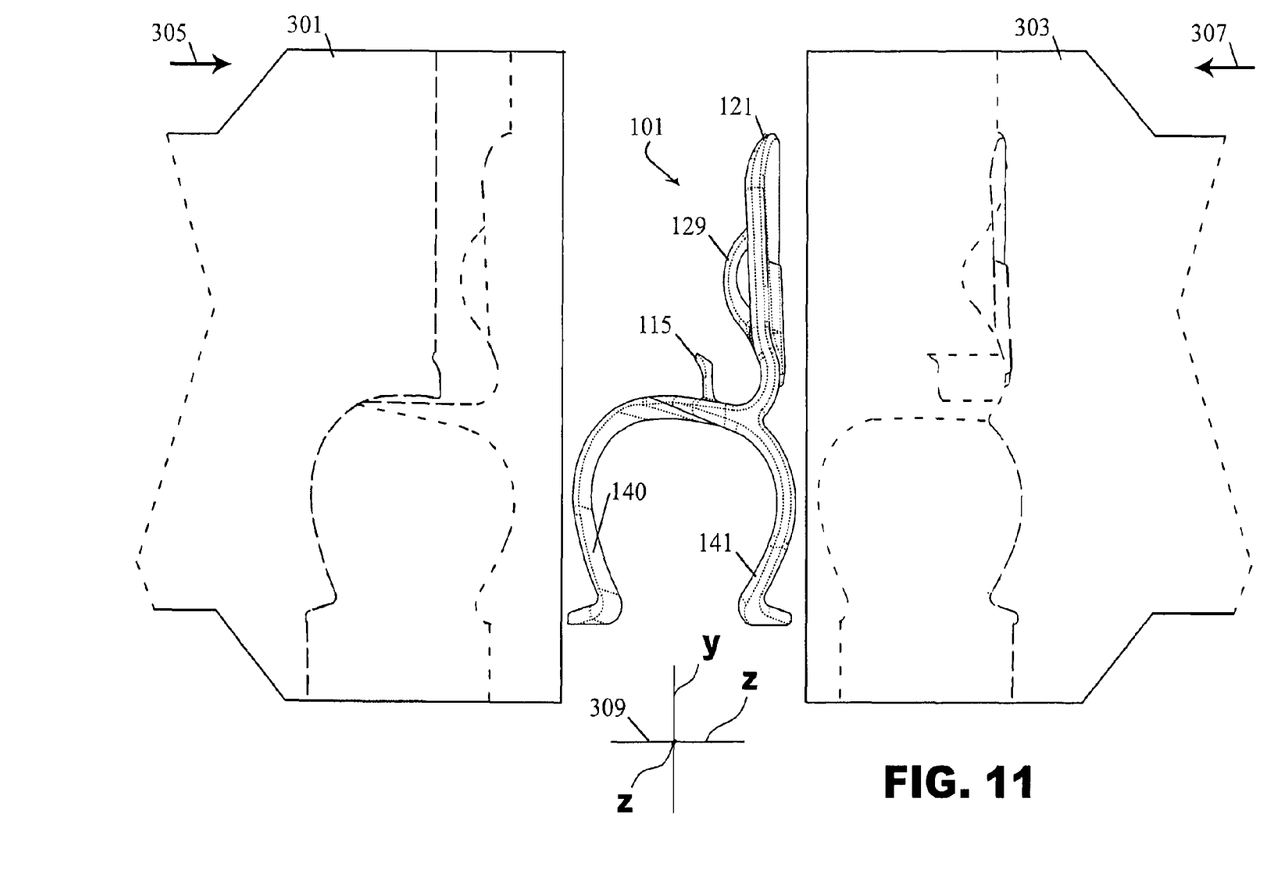
FIG. 11 is a left side view of the shopping aid of FIG. 2, and illustrates fabrication of the shopping aid using a single mold.

As mentioned earlier, one design aspect of the shopping aid presented in FIGS. 1-3 is inexpensive manufacture, with the aid being formed as substantially a single piece, via a single mold. [Advertising stickers or screening, and magnets for mounting the aid to the vertical wall of an appliance can be easily added after injection molding but, preferably, the aid of FIGS. 1-3 is formed as a unitary piece through the molding process, with no freely moving parts.] FIG. 11 is used to illustrate this molding process—in particular, FIG. 11 shows two mold halves, 301 and 303, which are brought together as indicated by reference arrows 305 and 307, for an injection molding process. As has been described above, the shopping aid 101 is preferably designed to have walls, flanges and so forth that do not overlap one another in the directions of mold convergence or separation. [These directions are depicted in FIG. 11 as the two directions parallel to the "z" axis, itself depicted by reference numeral 309 in FIG. 11.] In particular, all walls and flanges of the shopping aid 101 are made to be non-overlapping along this dimension; using the example presented by FIG. 11, the pen or pencil clip 115 is made so as to not overlap the support member 121 (i.e., it is matched to a gap in the support member, the gap not being seen in FIG. 11); the document clipping member 129 is similarly made to overlap the support member, by its match to a similar gap in the support member in the "z"-dimension; and, the forward jaw 140 and rearward jaw 141 are configured to similarly not overlap in the "z"-dimension.

While one molding process and configuration has been described as particularly advantageous in reducing manufacturing costs, as will be readily perceived by those having experience in industrial design, other configurations besides those presented in the accompanying figures may also be employed to reduce manufacturing costs. For example, a shopping aid could be designed for single-mold fabrication with mold halves separated along a different direction, or combination of directions, than along the "z"-axis of FIG. 11. Alternatively, if cost is not a sensitive issue, designs could be employed which do not require fabrication via a single mold.

VI. CONCLUSION

Having thus described several exemplary implementations of the invention, it will be apparent that various alterations, modifications, and improvements will readily occur to those skilled in the art. To provide one such example, it was earlier mentioned that two design aspects of the shopping aid of FIGS. 1-3 are that the aid includes no inherent substantial writing surface or clipboard, and that the shopping aid clips documents and clamps onto a shopping cart in substantially opposite directions (such as indicated by arrows 117 of FIG. 1). FIG. 12 shows one alternate orientation of the aid 101 presented in FIGS. 1-3, where the aid still clips a document 109 and clamps onto the push bar 105 in substantially opposite sense, and where the document is still supported in a substantially vertical orientation. FIG. 12, however, shows the shopping aid clamped underneath the push bar 105 of a shopping cart, where the document clip mechanism 107 engages the top 321 of the document instead of the bottom (as was seen in FIG. 1). Such alterations, modifications, and improvements, though not expressly described above, are nonetheless intended and implied to be within the spirit and scope of the invention. Using the particular example presented by FIG. 12, it is readily seen that the shopping aid 101 is similarly employed to clip document and clamp cart in substantially opposite senses, without any substantial writing surface support or clipboard.

Accordingly, the foregoing discussion is intended to be illustrative only, to provide an example of one particular shopping aid design and several design aspects which implement principles of the present invention; other designs, uses, alternatives, modifications and improvements will also occur to those having skill in the art which are nonetheless within the spirit and scope of the present invention, which is limited and defined only by the following claims and equivalents thereto.

The invention claimed is:

1. A portable shopping aid, comprising: a document holding portion to hold a document to permit reading from a direction substantially normal to the document; and a clamp portion including two or more opposing legs that are mounted by the portable shopping aid in fixed relationship to one another, the clamp portion to engage a structure extending in a first dimension using spring force provided the fixed relationship of the two or more opposing legs; wherein the clamp portion is oriented such that the portable shopping aid retains the document such that the direction is substantially perpendicular to the first dimension, each of the opposing legs terminates in a foot, the collective feet mounted in substantially a common plane to stably support the portable shopping aid on a substantially horizontal surface, such that the portable shopping aid when supported on the surface retains the document in a manner substantially orthogonal to the surface, and the opposing legs of the clamp portion include at least three legs each having an inwardly concave profile and to terminate in a manner producing a gap between two of at least three legs, the gap aligned with a third of the at least three legs along the direction substantially normal to the document, and said aid has non-overlapping components along a direction in which a mold may be separated to fabricate said portable shopping aid, the direction in which a mold may be separated being substantially perpendicular to the first dimension.

2. The portable shopping aid of claim 1, wherein the document holding portion includes at least three members that do not overlap each other in the direction in which a mold may be separated, the at least three members of the document holding portion including at least two spaced apart support members that are canted and a document clipping member to resiliently urge the document toward a region intermediate the at least two spaced apart member, to thereby bend the document to impart at least some structural rigidity notwithstanding influence of gravity.

3. The portable shopping aid of claim 1, wherein the legs of the clamp portion are non-overlapping components along a direction in which a mold may be separated to fabricate said portable shopping aid, the direction in which a mold may be separated being substantially perpendicular to the first dimension.

4. The portable shopping aid of claim 3, further comprising a pencil holder having components that are non-overlapping along the direction in which the mold may be separated, to retain a pen or pencil in a manner substantially parallel to the first dimension.

5. The portable shopping aid of claim 1, for use where a shopping cart bar as the structure, the shopping cart bar having a substantially circular cross section, the first dimension representing a length axis of the shopping cart bar and the second dimension parallel to the substantially circular cross section, the inwardly concave profile of the legs to substantially mate with the substantially circular cross section.

6. The portable shopping aid of claim 1, further comprising at least one magnet to magnetically retain the portable shopping aid against a metal surface, wherein the portable shopping aid is further fabricated as a single piece with no hinged parts.

7. The portable shopping aid of claim 6, further comprising a back that mounts the at least one magnet, the back is substantially perpendicular to the horizontal surface.

8. The portable shopping aid of claim 6, wherein the portable shopping aid mounts the at least one magnet in a manner to retain the document in a substantially consistent vertical orientation, notwithstanding whether the portable shopping aid is oriented to rest upon its feet on a substantially horizontal surface or magnetically mounted to a substantially vertical metal surface.

9. The portable shopping aid of claim 1, wherein each foot comprises a flange formed at a termination of at least one of the opposing legs, each flange extending substantially orthogonally to the associated one of the opposing legs.

10. The portable shopping aid of claim 1, further comprising a pencil holder to retain a pen or pencil in a manner substantially parallel to the first dimension.

11. The portable shopping aid of claim 1, wherein the direction of mold separation is along the direction substantially normal to the document.

12. A portable shopping aid, comprising:
an integral piece of resilient plastic, formed from a single mold with no hinged parts and no parts that are overlapping along a direction of mold separation;
the integral piece of resilient plastic having a document holding portion to hold a document to permit reading from a direction that is substantially coplanar with the direction of mold separation; and
the integral piece of resilient plastic having a clamp portion including two or more opposing legs mounted in fixed relationship to one another, to engage an axial structure extending principally in a first dimension using spring force provided the fixed relationship of the two or more opposing legs;
wherein the direction of mold separation is substantially perpendicular to the first dimension, and each of the opposing legs to stably support the portable shopping aid on a surface, such that the portable shopping aid when supported on the surface retains the document in a manner substantially orthogonal to the surface.

13. The portable shopping aid of claim 12, wherein the document holding portion includes at least three members that do not overlap each other in the direction of mold separation, the at least three members of the document holding portion including at least two spaced apart support members that are canted and a document clipping member to resiliently urge the document toward a region intermediate the at least two spaced apart member, to thereby bend the document about the document clipping member to impart at least some structural rigidity notwithstanding influence of gravity.

14. The portable shopping aid of claim 12, wherein the opposing legs of the clamp portion include at least three legs each having an inwardly concave profile to mate with a substantially circular cross section shopping cart bar as the structure and to terminate in a manner producing a gap between at least two of said legs, the gap aligned with a third of the at least three legs along the direction substantially normal to the document.

15. The portable shopping aid of claim 14, wherein the legs of the clamp portion are non-overlapping in the direction of mold separation.

16. The portable shopping aid of claim 12, further comprising a pencil holder having non-overlapping components along the direction of mold separation.

17. The portable shopping aid of claim 12, further comprising a pencil holder having non-overlapping components along the direction of mold separation, wherein the pencil holder retains a pen or pencil in a manner substantially parallel to the first dimension.

18. The portable shopping aid of claim 12, further comprising at least one magnet to magnetically retain the portable shopping aid against a metal surface.

19. The portable shopping aid of claim 18, further comprising a back that mounts the at least one magnet, the back is substantially perpendicular to the horizontal surface.

20. The portable shopping aid of claim 18, wherein the portable shopping aid mounts the at least one magnet in a manner to retain the document in a substantially consistent vertical orientation, notwithstanding whether the portable shopping aid is oriented to rest upon its feet on a substantially horizontal surface or magnetically mounted to a substantially vertical metal surface.

21. The portable shopping aid of claim 12, where the direction of mold separation and the direction of reading of the document are substantially parallel.

22. A portable shopping aid, comprising: means for holding a document to permit reading from a direction substantially normal to the document; two or more opposing legs that are mounted by the portable shopping aid in fixed relationship to one another, the opposing legs to engage a structure extending in a first dimension using spring force provided the fixed relationship; means for stably supporting the portable shopping aid on a substantially horizontal surface; and means for selectively mounting the portable shopping aid to a substantially vertical metal surface; wherein the portable shopping aid is fabricated as a single piece with no hinged parts, and said aid has no overlapping components along a direction in which a mold may be separated to fabricate said portable shopping aid, the direction in which a mold may be separated being substantially perpendicular to the first dimension.

23. The portable shopping aid of claim 22, for use with a shopping cart bar as the structure, the first dimension representing an axial dimension of the shopping cart bar.

\* \* \* \* \*